United States Patent [19]

Tsuge et al.

[11] 4,232,886
[45] Nov. 11, 1980

[54] TENSIONING DEVICE FOR SEAT BELT

[75] Inventors: Noboru Tsuge, Kariya; Satosi Kuwakado, Aichi; Toshihiro Takei; Toshiaki Shimogawa, both of Okazaki, all of Japan

[73] Assignee: Nippon Soken, Inc., Nishio, Japan

[21] Appl. No.: 20,045

[22] Filed: Mar. 13, 1979

[30] Foreign Application Priority Data

Mar. 21, 1978 [JP] Japan .................................. 53-32012

[51] Int. Cl.³ ............................................. B60R 21/10
[52] U.S. Cl. ...................................... 280/806; 60/632
[58] Field of Search .................. 280/805, 806, 807; 60/632, 633, 634, 635, 636, 637, 638; 297/471, 472, 480; 92/34, 35

[56] References Cited

U.S. PATENT DOCUMENTS

| 862,867 | 8/1907 | Eggleston | 138/30 |
|---|---|---|---|
| 3,461,725 | 8/1969 | Gardiner | 92/34 |
| 3,528,344 | 9/1970 | Rabenhorst | 92/35 |
| 3,871,470 | 3/1975 | Schwanz | 180/82 C |
| 3,879,054 | 4/1975 | Lindblad | 280/806 |
| 3,957,281 | 5/1976 | Pech | 280/744 |

*Primary Examiner*—John J. Love
*Assistant Examiner*—Randall A. Schrecengost
*Attorney, Agent, or Firm*—Cushman, Darby & Cushman

[57] ABSTRACT

A tensioning device for a seat belt for protecting a passenger at an urgent time by restraining him on his seat by a tensioned seat belt. A base is adapted to be fixed to a vehicle, and spaced from the base is a plate to which is connected one end of a seat belt which itself is movably inserted through the central portion of the base. At least one flexible cylindrical body is connected between the base and the plate to form a sealed chamber. The cylindrical body is normally in a contracted state, and a gas supplying means which supplies a high pressure gas at an urgent time into the sealed chamber elongates the contracted cylindrical body into a flat sheet to tension the seat belt and restrain the passenger on his seat.

9 Claims, 4 Drawing Figures

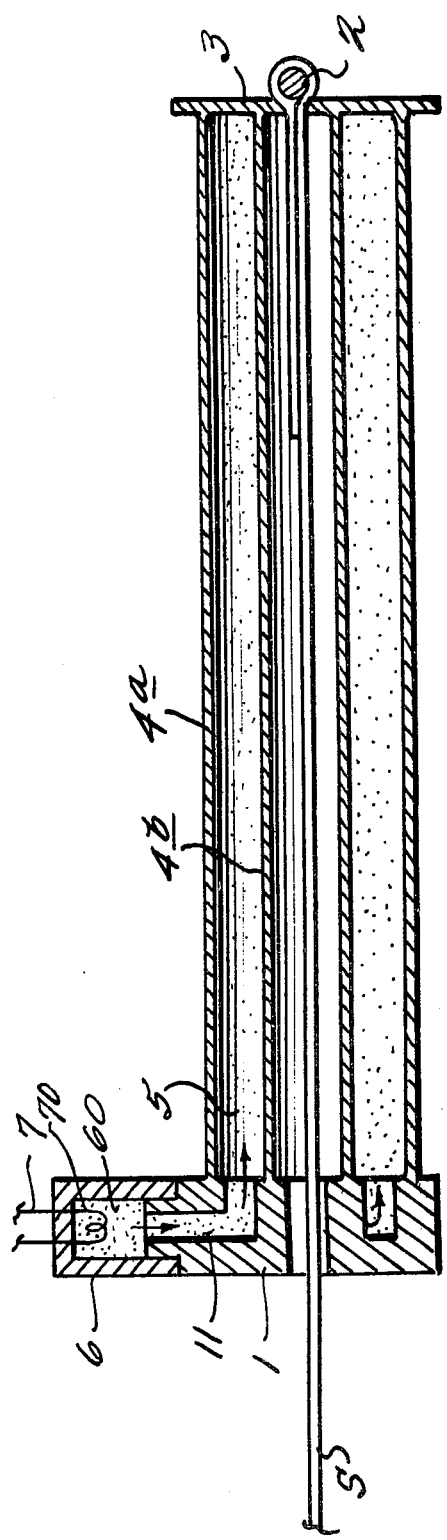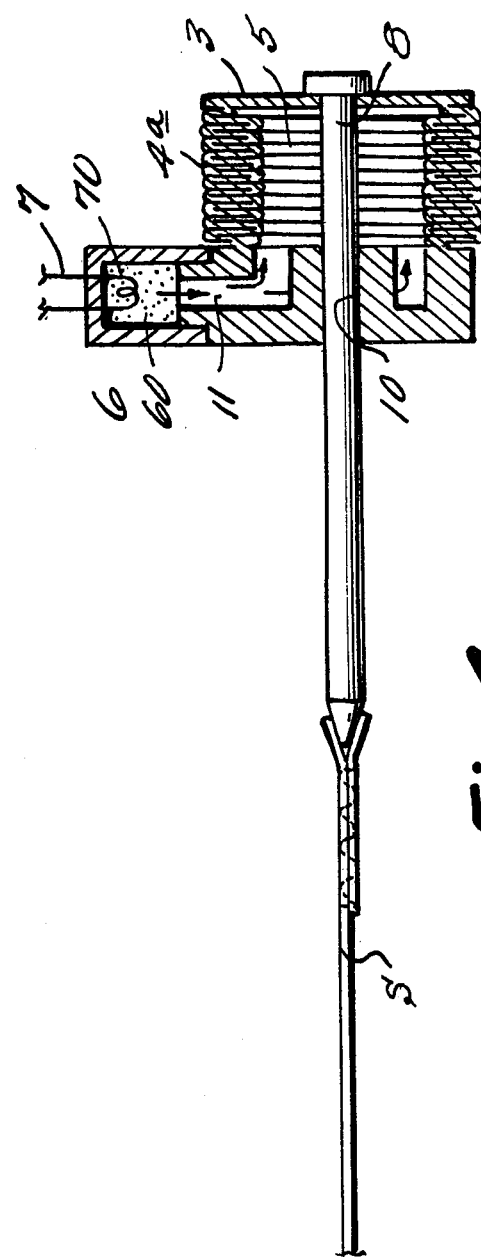

TENSIONING DEVICE FOR SEAT BELT

The present invention relates to a seat belt tensioning device for a vehicle, etc. to protect a passenger or occupant at an urgent time such as upon an impact of the vehicle by restraining him by a tensioned seat belt.

Conventionally, a seat belt tensioning device of this general type is provided with a piston rod of which one end is connected to the seat belt, a piston which is connected to the piston rod, a cylinder for receiving the piston slidably therein and a driving means which operates the piston to slide relative to the cylinder at an urgent time. By means of the driving means, the piston is slid or moved within the cylinder to tension the seat belt.

However, in the conventional tensioning device having such a construction as described above, the cylinder is required to have enough length to obtain a piston stroke equal to the tensioning quantity or length desired for the seat belt. Furthermore, it is required to project the piston rod outside of the cylinder by a length equal to the piston stroke. Therefore, a space of at least two times as long as the tensioning length of the seat belt is necessary. See U.S. Pat. Nos. 3,871,470 and 3,957,281. Further, the space must be secured along one straight line. As a result, the conventional device cannot be easily installed in a limited space such as is normally available in a vehicle for such a device, for example in a pillar near the floor adjacent a vehicle seat.

Accordingly, it is an object of the present invention to provide a small sized tensioning device for a seat belt which can be easily installed in such a limited space of a vehicle.

It is another object of the present invention to provide a tensioning device for a seat belt by which a passenger can be certainly restrained on his seat.

Other objects and advantages of the invention will become apparent from the following description of embodiments with reference to the accompanying drawings wherein:

FIG. 3 is a front view in section of a tensioning device of the first embodiment of the present invention, in an elongated state at an urgent time; and FIG. 4 is a front view in section of a tensioning device of the second embodiment of the present invention, in a normal condition.

DETAILED DESCRIPTION OF EMBODIMENTS

According to the present invention, one end of a seat belt which restrains a vehicle occupant or passenger is connected with a free end of a flexible body which is normally in a contracted state, and at an urgent time the flexible body is elongated to tension the seat belt.

Figure 1:
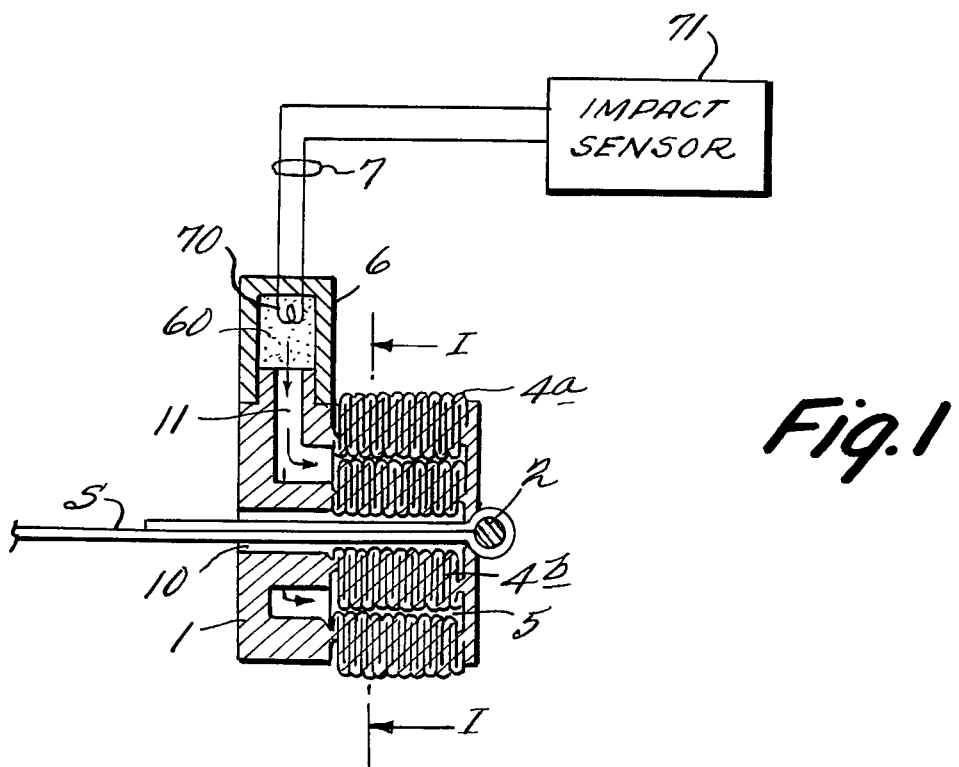
FIG. 1 is a front view in section of a tensioning device, in a normal condition, of a first embodiment of the present invention.
Figure 2:
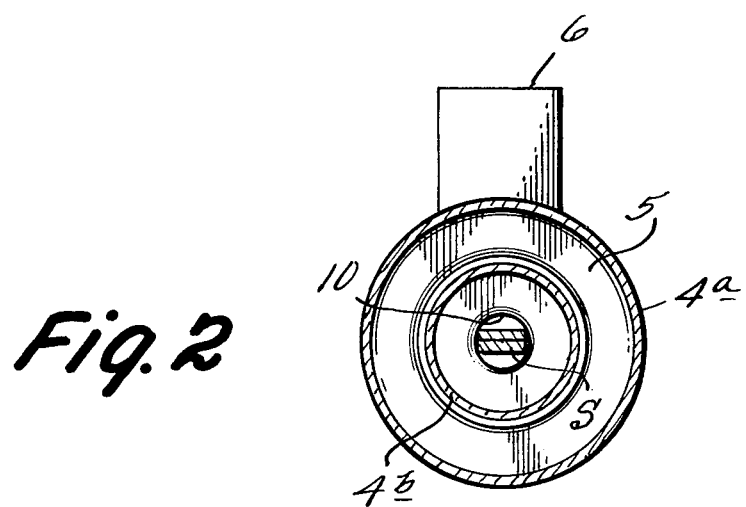
FIG. 2 is a transverse sectional view of a tensioning device of the first embodiment of the present invention taken along the line I—I of FIG. 1.

The first embodiment of the present invention is now explained with reference to FIGS. 1 to 3.

A circular base member 1 having a hole 10 in its central portion is conveniently adapted to be fixed to a vehicle in an appropriate space. Seat belt S is inserted through hole 10 and is connected by fastening means 2 to the central portion of a plate member 3 having a diameter equal to that of base member 1. The other end of seat belt S is conventionally connected to a vehicle or another seat belt, for example.

Base member 1 and plate member 3 are connected by an outer cylindrical body 4a and radially inwardly spaced therefrom by an inner cylindrical body 4b, both of which bodies are made of steel sheet and formed into a bellow shape. These cylindrical bodies 4a and 4b are coaxially disposed. A sealed chamber 5 is formed by base member 1, plate member 3 and cylindrical bodies 4a and 4b. Base member 1 and plate member 3 are made of steel, and are connected with the two cylindrical bodies 4a and 4b by a welding process.

In the outer periphery of base member 1 is attached a case 6 for forming a powder chamber 60 which contains a propellant charge. The powder chamber 60 is communicated with sealed chamber 5 through an annular gas passage 11 formed within base member 1.

A filament 70 is disposed within the propellant and connected to a known impact sensor 71 which at an urgent time such as upon an impact of a vehicle, generates electric signals through a lead wire 7.

In a seat belt tensioning device having the above mentioned construction, the electric signals which are generated in the impact sensor at an urgent time are transmitted to the filament 70 to generate heat. As a result, the propellant is ignited, and the exploded propellant produces plenty of high pressure gas. The gas pours into sealed chamber 5 through passage 11 of base member 1. Then, the bellow shaped cylindrical bodies 4a and 4b are elongated by the high gas pressure. Plate member 3 is thereby moved to the right in FIGS. 1 and 3 and tightens the seat belt S which is connected to the plate member into the tensioning direction. Finally as shown in FIG. 2, each of two flexible cylindrical bodies 4a and 4b is elongated into a flat sheet by the high pressure of the gas. Consequently, the seat occupant is restrained on the seat by the tensioned seat belt and is prevented from a secondary impact.

FIG. 4 shows a second embodiment of the present invention.

In this case, sealed chamber 5 is formed by base member 1, plate member 3 and a single flexible cylindrical body 4a which is formed into a bellow shape. Plate member 3 is connected to one end of a rod 8 which is slidably and airtightly inserted into a hole 10 of the base member 1. The other end of the rod 8 is connected to seat belt S.

The other parts of the second embodiment are similar to those of the first embodiment.

In the second embodiment, the propellant is exploded at an urgent time to supply a high pressure gas into the sealed chamber 5. Then, the cylindrical body 4a is elongated into a flat sheet, and rod 8 is moved rightwardly in FIG. 4 to draw up or tension the selt belt S which is connected with rod 8. As a result, the passenger can be restrained on his seat.

In the first and second embodiments, iron sheets formed into a bellow shape respectively are used as flexible cylindrical bodies. In addition, if the device of the present invention is installed in a space such as that formed between steel plates of a vehicle body and that within a pillar thereof so that the cylindrical body may be guided and elongated in a predetermined direction within the space, a bellow shaped hose made of other material having a flexibility such as rubber and synthetic resin can be used as the cylindrical body.

In this case, it is desirable to perform a heat resisting surface treatment, such as a Teflon coating, on at least the inner surface of the hose which is subject to contact with the gas.

As a gas supplying means for elongating the cylindrical body, an inert high pressure gas, an explosive high pressure gas, etc. can be used for the propellant.

As described above, according to the present invention, the seat belt can be positively tensioned with certainty. In addition, various effects can be achieved as follows.

Namely, since the flexible body which is normally contracted is elongated only at an urgent time, a wide space for the device of the present invention is unnecessary compared with the conventional device in which a piston is movably provided. If there is a space equal to the tensioning length of the seat belt, the present device can be installed therein.

Furthermore, the elongating direction of the flexible cylindrical body is not limited to a straight line, since a slightly bent or curved direction may be employed. That is, the present device can be installed even within a curved space. Therefore, the device of the present invention can be installed in a limited space such as available in a vehicle with great ease.

Having now fully described the invention, it will be apparent to one of ordinary skill in the art that many changes and modifications can be made thereto without departing from the spirit or scope of the invention as set forth herein.

What is claimed is:

1. A tensioning device for a vehicle seat belt comprising:
   a base member,
   a movable plate member,
   flexible bellow means, including at least one bellow shaped cylindrical body, connected between said base member and said plate member to form a sealed chamber therebetween, said bellow means being normally in a contracted state,
   means for connecting one end of said seat belt through said base member to said plate member, and
   gas supplying means for releasing high pressure gas into said sealed chamber to elongate said bellow means by said high gas pressure for moving said plate member in a direction away from said base member to tension said seat belt at an urgent time.

2. A tensioning device for a vehicle seat belt comprising:
   a base member,
   a plate member,
   flexible bellow means, including at least one bellow shaped cylindrical body, connected between said base member and said plate member to form a sealed chamber therebetween, said bellow means being normally in a contracted state,
   means for connecting one end of said seat belt through said base member to said plate member, and
   gas supplying means for releasing high pressure gas into said sealed chamber to elongate said bellow means by said high gas pressure for tensioning said seat belt at an urgent time.

3. A device as in claim 2 wherein said bellow means includes said one bellow shaped cylindrical body as an outer cylindrical body and further includes a bellow shaped inner cylindrical body disposed to form said sealed chamber as an annular sealed chamber between said outer cylindrical body and said inner cylindrical body.

4. A device as in claim 2, 3 or 1 wherein said seat belt connecting means includes means for passing said one seat belt end through an aperture in said plate member and fastening that end at said plate member.

5. A device as in claim 2 wherein said cylindrical body is made of metallic sheet having said bellow shape.

6. A device as in claim 2 wherein said cylindrical body is made of a material having flexibility which is selected from the group consisting of rubber and synthetic resin and which has said bellow shape.

7. A device as in claim 2 wherein said gas supplying means comprises a casing fixed to said base member for forming a powder chamber charged with propellant, said chamber being communicated with said sealed chamber, heat generating means disposed within said propellant, and an impact sensor which detects a shock at said urgent time such as an impact of a vehicle for producing electric signals for said heat generating means to explode said propellant.

8. A device as in claim 2 wherein said bellow means is composed of only said one cylinder body and said sealed chamber is formed within said one cylindrical body between said plate member and said base member.

9. A device as in claim 2, 3 or 1 wherein said seat belt connecting means includes a rod extending from said plate member through said sealed chamber and movably through said base member gastightly.

* * * * *